(12) United States Patent
Lauriston (10) Patent No.: US 9,989,416 B2
(45) Date of Patent: Jun. 5, 2018

(54) PORTABLE COLOR MEASUREMENT DEVICE AND SYSTEM AND DYE DETERMINATION SYSTEM

(71) Applicant: Andrew Hugh Lauriston, London (GB)

(72) Inventor: Andrew Hugh Lauriston, London (GB)

( * ) Notice: Subject to any disclaimer, the term of this patent is extended or adjusted under 35 U.S.C. 154(b) by 8 days.

(21) Appl. No.: 15/350,341

(22) Filed: Nov. 14, 2016

(65) Prior Publication Data

US 2017/0138792 A1   May 18, 2017

(51) Int. Cl.
| | |
|---|---|
| G01N 21/25 | (2006.01) |
| G01J 3/50 | (2006.01) |
| G01J 3/02 | (2006.01) |
| G01J 3/42 | (2006.01) |

(52) U.S. Cl.
CPC .............. *G01J 3/50* (2013.01); *G01J 3/0202* (2013.01); *G01J 3/0264* (2013.01); *G01J 3/0267* (2013.01); *G01J 3/0272* (2013.01); *G01J 3/0291* (2013.01); *G01J 3/42* (2013.01)

(58) Field of Classification Search
CPC .......... G01J 3/50; G01J 3/0202; G01J 3/0264; G01J 3/0267; G01J 3/0272; G01J 3/0291; G01J 3/42
USPC ......................................................... 356/406
See application file for complete search history.

(56) References Cited

U.S. PATENT DOCUMENTS

| | | | |
|---|---|---|---|
| 5,083,868 A | 1/1992 | Anderson | |
| 6,002,488 A | 12/1999 | Berg et al. | |
| 6,198,536 B1 * | 3/2001 | Baker | G01J 3/50 |
| | | | 250/226 |
| 2001/0015806 A1 | 8/2001 | Baker | |
| 2003/0007154 A1 * | 1/2003 | Tandon | G01J 3/51 |
| | | | 356/406 |
| 2004/0000015 A1 | 1/2004 | Grossinger et al. | |
| 2005/0243317 A1 * | 11/2005 | Baker | G01J 3/50 |
| | | | 356/402 |
| 2005/0275842 A1 * | 12/2005 | Simons | G01J 3/46 |
| | | | 356/402 |
| 2008/0068604 A1 * | 3/2008 | Grossinger | A45D 44/005 |
| | | | 356/328 |
| 2009/0325631 A1 | 12/2009 | Linjama et al. | |
| 2010/0111369 A1 | 5/2010 | Lussier | |
| 2013/0016200 A1 * | 1/2013 | Ovod | A61B 1/06 |
| | | | 348/68 |

(Continued)

FOREIGN PATENT DOCUMENTS

| | | |
|---|---|---|
| EP | 0 444 689 A2 | 9/1991 |
| ES | 2 400 411 | 4/2013 |

(Continued)

*Primary Examiner* — Hina F Ayub
(74) *Attorney, Agent, or Firm* — Thomas | Horstemeyer, LLP (57) ABSTRACT

A portable color measurement device 10 is described. The device 10 has a body 20 including a light source 30 and a sensor 40. The body 20 includes a measurement zone 21 to accommodate, within the body 20, an element 100 to be measured for color. The light source 30 is configured to emit light along a path within the body 20 to the sensor 40. The measurement zone 21 is substantially in the path. The portable color measurement device is configured to measure properties of an accommodated element 100 in dependence on one or more outputs of the sensor 40.

19 Claims, 8 Drawing Sheets

(56) References Cited

U.S. PATENT DOCUMENTS

2016/0080548 A1* 3/2016 Erickson ............ H04M 1/72527
455/556.1

FOREIGN PATENT DOCUMENTS

| WO | 94/24530 A1 | 10/1994 |
| WO | 2005/080929 A1 | 9/2005 |
| WO | 2011/051399 A1 | 5/2011 |

* cited by examiner

PORTABLE COLOR MEASUREMENT DEVICE AND SYSTEM AND DYE DETERMINATION SYSTEM

CROSS-REFERENCE TO RELATED APPLICATIONS

This application is based on and claims priority to Great Britain Patent Application Serial No. 1519989.6 filed on 12 Nov. 2015 which is hereby incorporated by reference as if set forth in its entirety herein.

FIELD OF THE INVENTION

The present invention relates to a portable color measurement device and system that is particularly applicable for use by end-users.

BACKGROUND TO THE INVENTION

Color matching is as much of an art as it is a science.

There exist various systems for describing colors. For example, CMYK system approximates colors to their closest Cyan (C), Magenta (M), Yellow (Y) and Black (K) pigments and works on the basis that two printers or display devices using the same proportions of pigments should produce approximately the same color.

A more accurate system is the pantone system which is a commonly used system for matching colors in printing and inks. A number of spot colors are standardised and each given a pantone number. Most of these cannot be simulated using CMYK as they are formed from proportions of 14 base pigments. Pantone color numbers are used to prescribe colors to be used in reproducing all manner of items including logos and other typographic material and flags.

If a standardised color such as a pantone is selected from the outset, it can be reasonably straightforward to reproduce the desired color. However, when a user is faced with a sample of a product, a paint, an ink or fabric, for example, identifying the color becomes much more complex.

Color identification and matching in the interior design field, for example, has traditionally been a time-consuming and imprecise process. An interior designer or consumer currently attempts to match swatches from wallpaper, fabrics and paint chips in the hope that when in the intended environment they still look the same. One particular issue is that a perceived color is dependent on lighting. A color viewed in a retail store under fluorescent lighting will often look different to the color when viewed in sunlight or at the consumer's home.

While there exist measurement devices that apply an analytical and scientific approach rather than a subjective approach to color measurement, these are typically bench based devices that are large, expensive and fragile due to the need to maintain a standardised and calibrated measurement environment.

STATEMENT OF INVENTION

According to an aspect of the present invention, there is provided a portable color measurement device having a body including a light source and a sensor, the body including a measurement zone to accommodate, within the body, an element to be measured for color, the light source being arranged to emit light along a path in the body to the sensor, wherein the measurement zone is substantially in the path, the portable color measurement device being operable to measure properties of an accommodated element in dependence on one or more outputs of the sensor.

Embodiments of the present invention seek to provide a color measurement system that is portable, preferably handheld, inexpensive, and allows an operator unskilled in color analysis to quickly and objectively perform accurate color measurements consistently. The measurements can then be used for many applications, for example, from color and dye/ink matching, to logging details of liked or owned clothing, to guided shopping for complimentary clothing or accessories.

Preferably, one embodiment includes a hand held photo electric device that will allow users to accurately identify and/or quantify color from the measured properties and produce data representing this that can then be communicated, for example over the internet. Preferably, the produced data is substantially device independent and classified according to a predetermined scale, code or scheme. Preferably, the scale, code or scheme is numeric or alphanumeric and is defined in a central data repository. In one embodiment, each device may be calibrated or include a calibration system to enable different devices to produce substantially the same produced data (for example, a reading according to the scale, code or scheme) when measuring the same sample.

Preferably, the portable color measurement device communicates with a user's portable computing device to provide data on the measured properties for storage, processing and/or onward communication over a data communications network such as the internet.

For example, the portable computing device may be a smart phone that communicates via BlueTooth® with the portable color measurement device.

Optionally, the portable color measurement device may be part of the user's portable computing device or part of a case for the portable computing device.

Optional embodiments may include hardware and/or software components or systems that consume the produced data. For example, a display or display driver may receive the captured data and provide a more color correct accurate screen display. For example, the display or display driver may correct color accuracy of an image corresponding to the measured sample. The hardware and/or software components or systems may use the captured data to assist in purchase or selection decisions based, for example, on color matching or compatibility.

The sensor preferably has a position in the path to receive light from the light source that is reflected by the element when in the measurement zone.

The portable color measurement device may further comprise a second light source configured to emit light along a further path, the further path being through the measurement zone and towards the sensor, the second light source being on an opposite side of the measurement zone to the sensor.

The portable color measurement device may further comprise a pair of levers forming opposing jaws around the measurement zone.

The portable color measurement device may further comprise a return spring applying a sprung force to urge the jaws together.

The portable color measurement device may further comprise a sensor (typically different to the sensor used to measure the light but in some embodiments the same sensor may be used) configured to activate the color measurement device when a force is applied to the two levers to open the jaws.

The portable color measurement device may further comprise a marker positioned on the body over the measurement zone.

The portable color measurement device may further comprise a mechanical shroud to screen entry of external light into the sensor during operation of the portable color measurement device. The mechanical shroud may be about the measurement zone and/or about the sensor.

The sensor may be configured to sample red, green and blue values for each of a plurality of pixels of the measurement zone.

The portable color measurement device may further comprise a short-range wireless communications system (such as Bluetooth, Bluetooth Low Energy or other similar technologies), the portable color measurement device being configured to communicate data on the measured properties using the short-range wireless communications system to a user device.

According to another aspect of the present invention, there is provided a portable color measurement system comprising a portable color measurement device having a body including a light source, a sensor and a short-range wireless communications system, the body including a measurement zone to accommodate, within the body, an area of an element to be measured for color, the light source being configured to emit light along a path within the body to the sensor, wherein the measurement zone is substantially in the path, the portable color measurement device being configured to measure properties of an accommodated element in dependence on one or more outputs of the sensor and to communicate data on the measured properties using the short-range wireless communications system to a user device.

The portable color measurement system may further comprising a user interface executed by the user device, wherein the user device includes a processor to execute the user interface and a short range wireless communications system to receive the data on the measured properties from the portable color measuring device, the user interface comprising:
computer program code configured to obtain the received data on the measured properties from the user device's short range wireless communications system; and,
computer program code configured to transform the received data on the measured properties into a scheme value, the scheme value representing color measured by the portable color measurement device from the accommodated element.

The sensor may be configured to sample red, green and blue values for each of a plurality of pixels of the measurement zone and the data on the measured properties includes data on the sampled values.

The user device may include a display, the user interface further comprising computer program code configured to output data on the scheme value on the display.

The user device may include a data communications system (such as one which uses WiFi and/or a mobile telecommunications network), the user interface further comprising computer program code to retrieve data associated with the scheme value from a remote data source via the data communications system and output the retrieved data on the display.

The remote data source may include data on products and data on each product's scheme value, the user interface further comprising computer program code to select one or more products having scheme values compatible with the scheme value of the element from the remote data source, retrieve data on said one or more products from the remote data source and output the retrieved data on the selected products on the display. Compatibility may be based on complimentary colors, a particular color scheme, closest matching colors and/or patterns, clashing colors etc.

The user device preferably comprises a smartphone, the user interface comprising an application executable by the smartphone. It will be appreciated that other user devices such as laptops, PCs, PDAs, smart watches, tablets or more bespoke items such as base stations, smart appliances and the like may be used.

According to another aspect of the present invention, there is provided a dye determination system comprising a color measurement device and a base station, the color measurement device having a body including a light source and a sensor, the body including a measurement zone to accommodate, within the body, an area of an element to be measured for color, the light source being configured to emit light along a path within the body to the sensor, wherein the measurement zone is substantially in the path, the color measurement device being configured to measure properties of an accommodated element in dependence on one or more outputs of the sensor and to communicate data on the measured properties to the base station;
the base station including a processor, an input device, an output device and a memory encoding data on dyes, the data on dyes including resultant color upon application of each dye to an element of an input color, the processor being configured to:
  execute computer program code to receive data on measured properties from the color measurement device;
  execute computer program code to determine an input color from the received data on the measured properties;
  execute computer program code to receive a selected resultant color from a user via the input device;
  execute computer program code to cross-reference the input color and the resultant color in the memory to determine a dye; and,
execute computer program code to output data on the determined dye via the output

BRIEF DESCRIPTION OF THE DRAWINGS

Embodiments of the present invention will now be described, by way of example only, with reference to the accompanying drawings in which.

DETAILED DESCRIPTION

Figure 1:
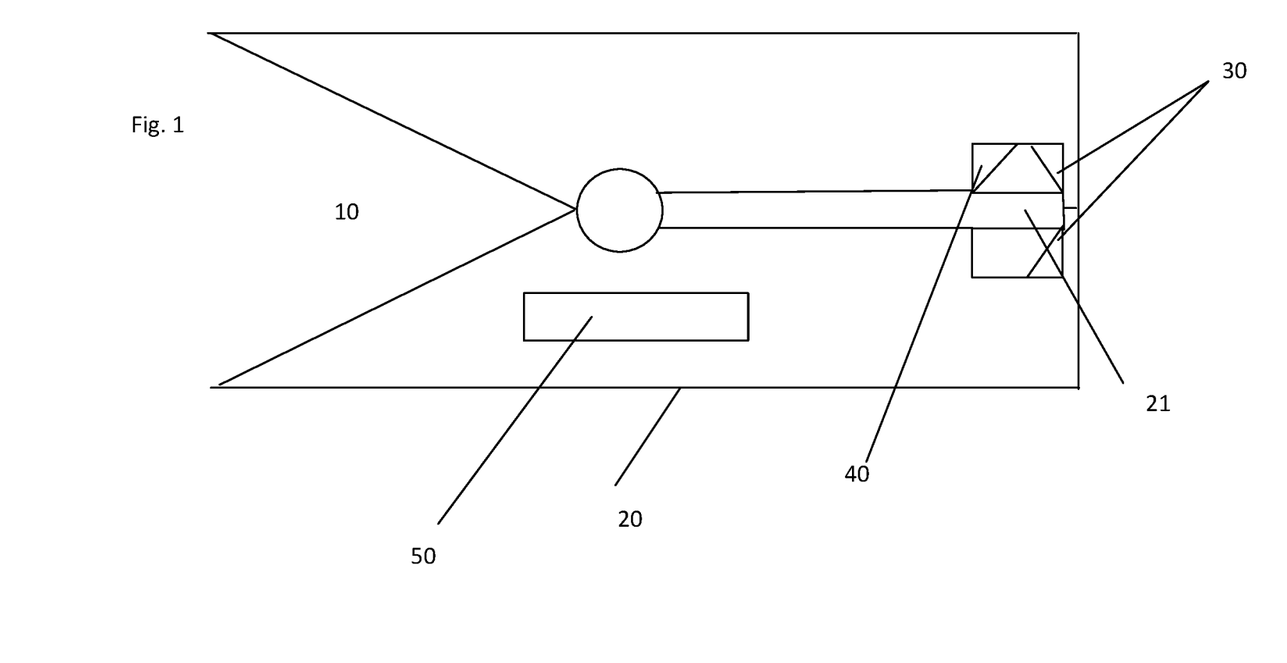
FIG. 1 is a schematic diagram of a portable color measurement device according to an embodiment.

FIG. 1 is a schematic diagram of a portable color measurement device 10 according to an embodiment.

The portable color measurement device 10 has a body 20 including a battery 50 that is arranged to power a light source 30 and a sensor 40. The body 20 includes a measurement zone 21 to accommodate, within the body 20, an element (also referred to as a sample, not shown in FIG. 1) to be measured for color. The light source 30 is preferably arranged to emit light along a path 31 (shown in FIG. 2) in the body 20 towards the sensor 30. The measurement zone 21 is substantially in the path 31. The portable color measurement device 10 is operable to measure properties of an accommodated element in dependence on one or more outputs of the sensor 40.

In the illustrated embodiment, there are two light sources, one opposite the sensor 40 and one adjacent the sensor 40. It will, however, be appreciated that other arrangements are possible. For example, there may be a single light source that is directed through one or more prisms, lenses or other light modifiers to divide, focus or otherwise direct the light. Similarly, only one light source may be used, either relying solely on reflection of the element to cause receipt of light at the sensor 40 or there may be a mirror or similar positioned in the light path so as to reflect light not reflected by the element.

The sensor 40 and light source 30 above the measurement zone 21 may be covered to protect the sensor and light source, for example by an optically transmissive cover or encapsulating material. Likewise, the opposing light source is preferably covered to protect it and at the same time allow light to pass through the measurement zone 21 to the sensor 40.

Where two or more light sources are used, sampling of color is preferably done measuring received light from the source adjacent the sensor on the same side of the measurement zone. Light source(s) on the opposite side of the measurement zone that would be substantially blocked by an element to be measured are preferably used to measure transparency and similar properties of the element which is interposed between the light source being operated and the sensor.

It may be that there are light source and sensor pairings or groupings with multiple light sources or sensors per grouping (or multiple pairings or groupings per device). Preferably, light sources are operated sequentially under the control of a processor or other controller in the device that executes a computer program or other programmed or hard-wired logic to control operation of the light sources and measure responses of the sensor(s) and then provides any further processing or communication functionality needed (various example arrangements are discussed below).

Preferably, the (or each) light source is a white LED lightsource. Preferably, the battery 50 is rechargeable. The device 10 may include a micro USB port, or similar, to receive a mini-USB connector for providing power to recharge the battery 50.

Figure 2:
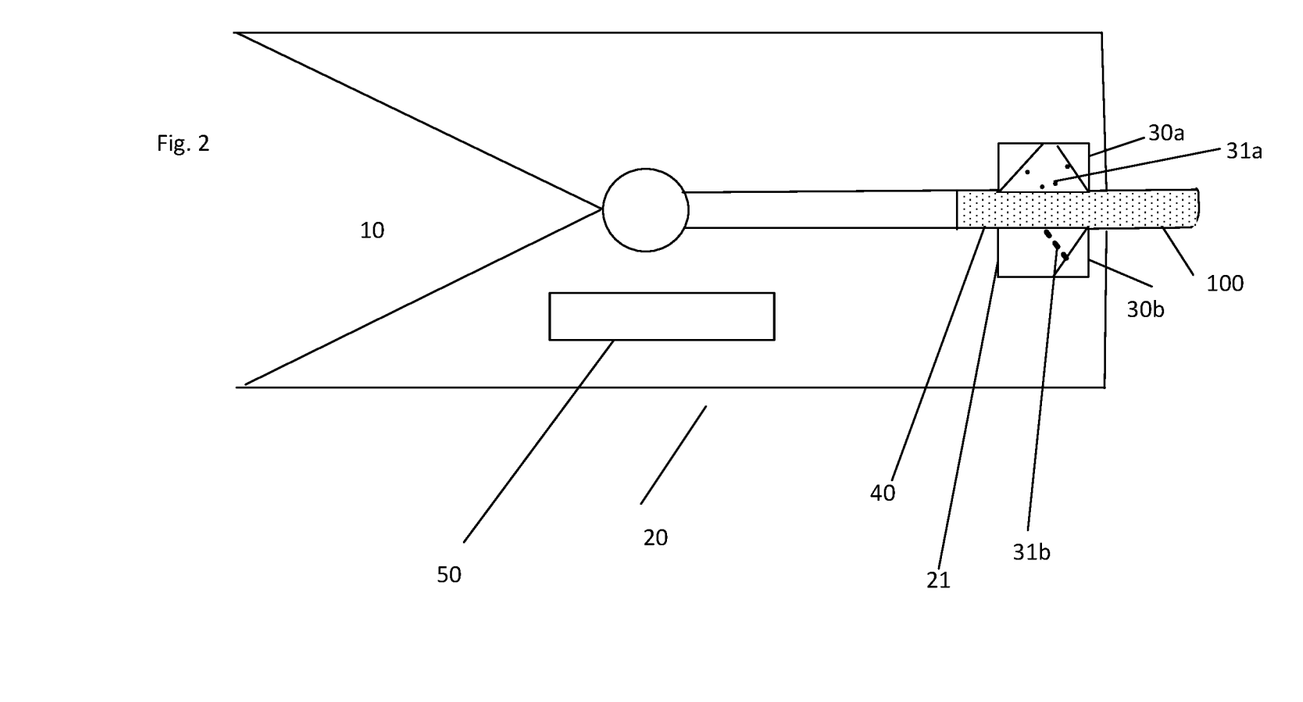
FIG. 2 is a schematic diagram of the device of FIG. 1 in operation.

FIG. 2 is a cross-sectional view of the device of FIG. 1 in operation.

An element 100, in this example a portion of cloth, is placed in the measurement zone 21 in the body. Light is emitted by the first light source 30a along the path 31a and a portion of the light may be reflected, refracted, diffused and/or absorbed by the element 100. The light that reaches the sensor 40 is measured. Light is then emitted by the second light source 30b along path 31b and a portion of the light may be reflected, refracted, diffused and/or absorbed by the element 100. The remaining light that reaches the sensor 40 is measured and used in conjunction with the measurement of light from the first light source 30a to determine color properties of the element 100.

Preferably, the sensor has been previously calibrated by operation of the device 10 without the presence of an element and/or in the presence of a "control" element of pre-determined properties. In this manner, attributes of the sensor and/or the light source(s) 30 can be compensated for when measuring elements.

The sensor may be a camera or similar sensor. Depending on application and intended cost for the device, the number of pixels and color resolution of the camera can be selected appropriately. Preferably, the camera is a so-called 4K camera (also known as a Quad HD, UHD or QFHD camera).

The sensor can output various measurements. In a preferred embodiment, the sensor outputs RGB measurements representing measurement of the Red, Green and Blue portions of the spectrum registered by the camera's pixels.

In one embodiment, R, G and B values are sampled for each pixel and used to determine a wavelength value for the sample in Nanometers (NM). It may be that the values across the sensor are averaged or some other similar processing performed to determine a color value according to a predetermined scale, code or scheme. Should there be significant divergence in color values (for example due to spots, stripes or multi-colors present), multiple values may be produced. Optionally, the sensor may be used to take a photograph of the element to maintain a record. Optionally, the record may be tagged or otherwise labelled with measured color values.

The scale, code or scheme may be numeric, alphanumeric or some other representation, although something that has minimal communication overhead and that can have a common meaning across all measurement devices is preferred. Preferably, the same sample, measured by two different measurement devices produces the same value from the scale, code or scheme (subject to measurement tolerances, positioning of the sample in the device etc).

The value in the scale, code or scheme of a sample is preferably calculated mathematically in dependence on the measured properties. In selected embodiments, the calculation may be performed by an associated device such as a smartphone. Further details of such an embodiment are set out below. However, it will be appreciated that the calculation may be performed locally on the device 10.

Although a single sensor is discussed in the various embodiments, it will be appreciated that multiple sensors may be provided in the body and used to obtain different measurements or to enable overlapping or duplicate measurements to be obtained and correlated or otherwise used to improve factors such as measurement accuracy, resolution and/or speed. Likewise, it will be appreciated that sensors may be used in different ways or modes to obtain different measurements as is discussed by way of example below.

Figures 3A, 3B:
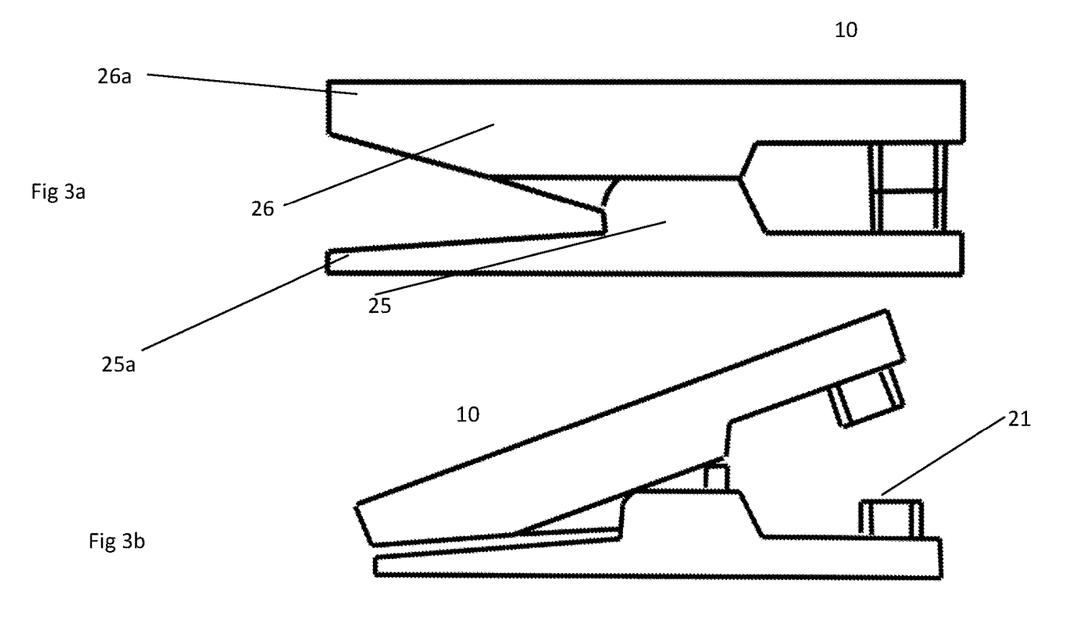
FIG. 3a is a perspective view of a portable color measurement device according to an embodiment when closed.
FIG. 3b is a perspective view of a portable color measurement device according to an embodiment when open.
Figure 3C:
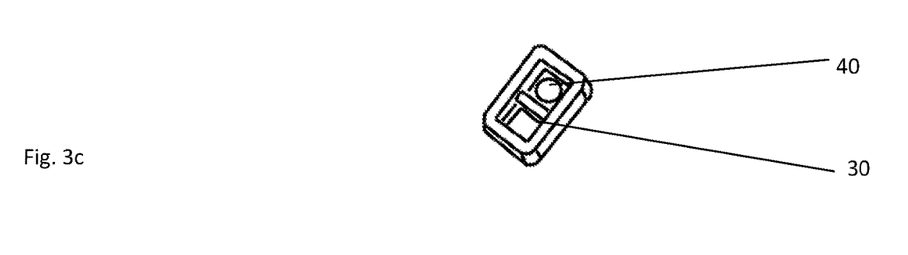
FIG. 3c is a perspective view of a sensor-emitter used in the embodiment of FIGS. 3a and 3b.

FIG. 3a is a perspective view of a portable color measurement device according to an embodiment when closed. FIG. 3b is a perspective view of a portable color measurement device according to an embodiment when open. FIG. 3c is a perspective view of a sensor-emitter used in the embodiment of FIGS. 3a and 3b.

Preferred embodiments take form and general size of a clothes peg. The embodiment of FIGS. 3a-c differs from that of FIG. 1 in the general shape of the body 20 and angling of light sources and sensors. However, the two embodiments operate under the same basic principles. Preferably, the portable color measurement device 10 includes a switch or other sensor that activates the color measurement device 10 when two levers 25, 26 of the body 20 are opened by a user applying a pinching force to their ends 25*a*, 26*a*. A return spring or other resilient sprung member such as a resiliently flexible beam causes the levers 25, 26 to return to the closed position of FIG. 3*a* when the pinching force is removed.

Once activated, the portable color measurement device 10 preferably provides measurements for 1 minute, after which time the device 10 powers itself down.

In a preferred embodiment, a user activates the color measurement device 10 by opening it as described above. She then clips/clamps the device 10 on to the sample. Measurements may then be provided to an associated user device such as a smartphone. Preferably, the measurements are provided to an app running on the smartphone (or other portable computing device) which then processes the measurements and appropriately displays them via a user interface and/or stores them and/or communicates them onward as described in more detail below.

Measurements may be provided and updated on the user interface as they become available on the color measurement device 10. Alternatively, a button or other control on the user interface on the mobile device 10 may be used to manually trigger obtaining a measurement from the color measurement device 10.

Optionally, a LED (not shown) indicator on the device is illuminated while the device is taking measurements. Preferably, no further buttons, switches, displays or indicators are provided on the device 10 and all further functionality and output is provided via a user interface on an associated device such as a smartphone. Further details of such an embodiment are set out below. It will be appreciated that further controls, displays etc could be provided on the device 10.

The LED (or some other marking) may be positioned over the measurement zone 21 and/or the sensor 40 so as to provide guidance to the user when positioning the sample in the measurement zone 21. For example, the sample may have different colors and it may be necessary to position it so as to guide the color to be measured (it will be appreciated that embodiments are described elsewhere in this application where multiple colors are measured from a sample to take into account patterns etc).

While embodiments preferably utilise the sprung closure mechanism used in some clothes pegs, it need not do so. In alternative embodiments, some other mechanism for receiving and engaging a sample may be used. For example, the device may include resiliently deformable opposing grips between which a sample may be forcibly inserted—for example by sliding. The device could optionally include a switch or other trigger that is activated as the sample is slid into place and enables presence of a sample to be detected and the device 10 switched on. In another example, the body 20 may be sufficiently flexible to enable a sample to be inserted between substantially fixed contacts. In yet another example, a mechanical action internal to or arising from parts of the body of the device may be used to receive and engage the sample. For example, a door may be closed to trap the sample in place or some internal clamp may be mechanically moved into place.

Preferred embodiments of the present invention are intended to be portable and unobtrusive such that they can be carried around by a user and used in conjunction with his or her smartphone to obtain color measurements. For example, the color measurement device 10 may be similar to the size of a clothes peg (approximately 100 mm×30 mm×30 mm). In one embodiment, the imaging area of the sensor may be approximately 3 mm². With such dimensions, the opening of the jaws 22, 23 of the device 10 may be around 10 mm. Preferably, as illustrated, an area beyond the measurement zone within the body 20 may accommodate part of the sample. In this way, if the area to be measured is not at an edge of the sample it can still be positioned over the measurement zone 21 as there is capacity in the body for the excess of the sample to also be retained.

Preferably, the color measurement device includes a mechanical shroud around the sensor and light source to ensure no external light source can affect the color measurement. Such an arrangement is shown in FIG. 3*b*. The arrangement of FIG. 3*b* also includes mechanical segregation of the light source from the sensor to minimise light being detected by the sensor that has not been reflected by the sample.

Figure 4:
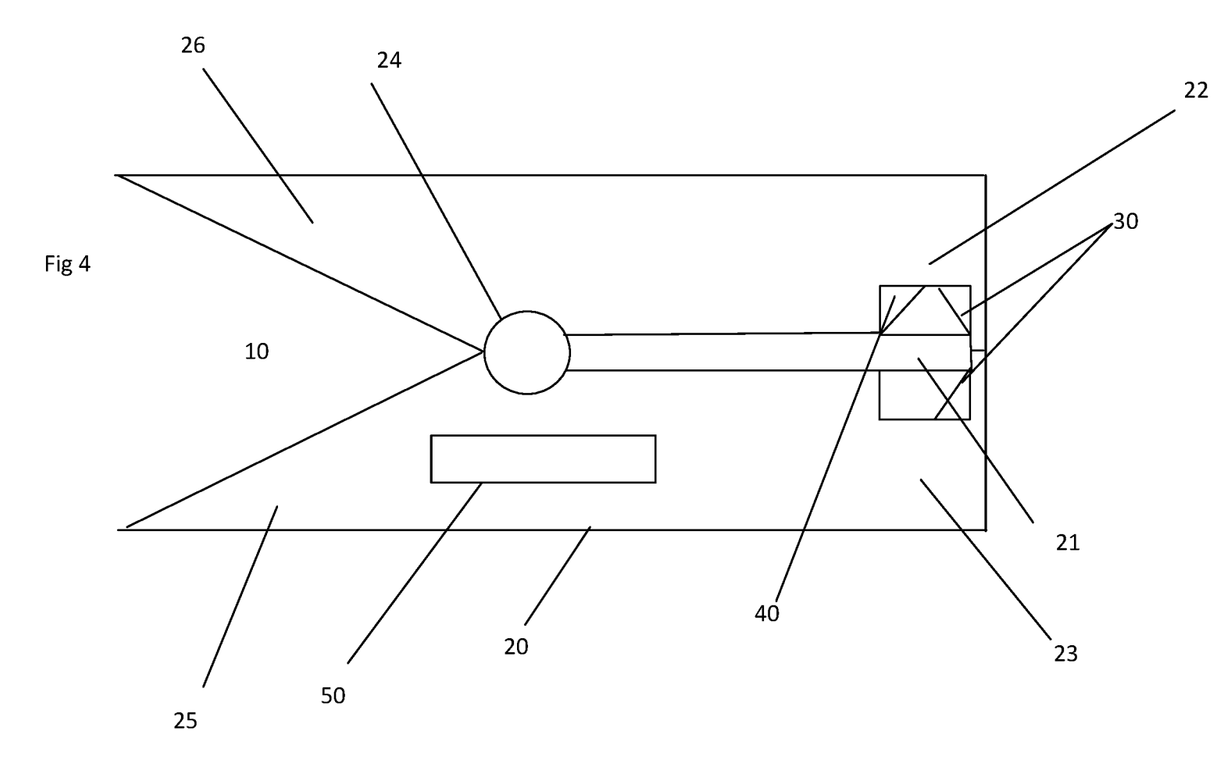
FIG. 4 is a cross-sectional view illustrating preferred aspects of an embodiment.

FIG. 4 is a cross-sectional view illustrating preferred aspects of an embodiment.

In preferred embodiments, as illustrated in FIG. 4, the portable color measurement device has opposing jaws 22, 23 around the measurement zone 21. A return spring 24 applies a sprung force to urge the jaws 22, 23 together. Levers 25, 26 enable a force to be applied by a user to cause the jaws to open. The scissor-like mechanism of the jaws enable them to clamp about an element to be measured, holding it in place.

Preferably, at least part of a clamping surface of the jaws is textured or grooved so as to securely hold a portion of the element between them and also to limit ingress of extraneous external light (and egress of light from the light source 30). Alternatively, at least a part of the jaws may be flexible (for example formed at least partially from a rubber or similar material) so as to deform around an element 100.

The portable color measurement device may include one or more buttons or other actuators on the body to allow a user to trigger measurement on demand. Alternatively, the portable color measurement device may include a switch or other closure sensor that is arranged to detect the closure of the jaws. The switch or closure sensor preferably causes triggering of measurement upon detecting closure of the jaws. In order to save power, the switch or closure sensor or some other unit of the device may be arranged to differentiate between the jaws closing about an element and the jaws closing when empty (triggering of a measurement only occurring in the presence of an element). In another alternative, the portable color measurement device may be controllable from a remote device (which may be attached or attachable by a cable or may be wirelessly connectable to the portable color measurement device such as by Bluetooth®). Examples of this are set out in embodiments below.

Bluetooth® pairing with the remote device may be initiated, for example, by holding the jaws in an open position for a predetermined time, such as 15 seconds.

Figure 5:
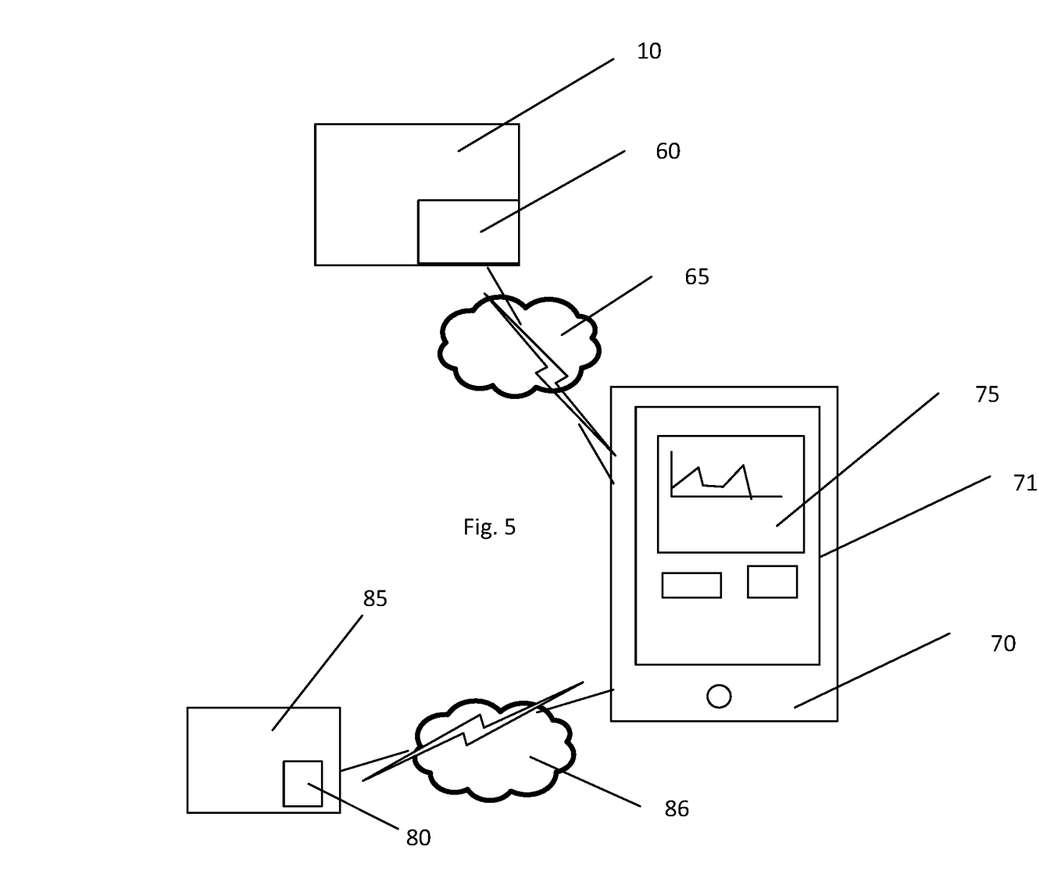
FIG. 5 is a schematic diagram of an embodiment.

FIG. 5 is a schematic diagram of an embodiment.

In the illustrated embodiment, the portable color measurement device includes a wireless communication system 60 that is arranged to communicate with a remote device 70.

In this example, the remote device 70 is illustrated as a smartphone having a touch screen display 71. However, it will be appreciated that other forms of remote devices could be used such as tablets, PCs, smart watches, and dedicated devices having an appropriate communication system and user interface.

In this embodiment, the portable color measurement device 10 and remote device 70 are paired and communicate via Bluetooth®, although it will be appreciated that other communication mediums and/or protocols could be used.

The remote device 70 includes a user interface 75 that enables a user to control the portable color measurement device 10 and/or view and/or interact with its measurements. The portable color measurement device 10 may be triggerable locally, for example in a manner such as that discussed above, or it may be triggerable by a button or other feature of the user interface 75.

Upon making a measurement, the portable color measurement device communicates data on the measurement to the remote device 70 via the wireless communication system 60.

Upon receipt the remote device 70 processes the received data and outputs information via the user interface 75 on the display 71.

In one embodiment, processing is done locally at the remote device 70. In another embodiment, the processing may be done locally at the remote device 70 to produce a code or other representation of color that is then compared against one or more remote databases 80 as discussed below.

In another embodiment, processing may be done at a remote system 85 with the remote device 70 only acting as a communication relay between the portable color measurement device 10 (which the remote device 70 preferably communicates over low-power local wireless communication network 65) and the remote system 85 (with which the remote device 70 preferably communicates over long range such as via the internet/mobile telephone network 86). In such an arrangement, it will be appreciated that the remote device 70 need not have a suitable display or offer a user interface.

Figure 6:
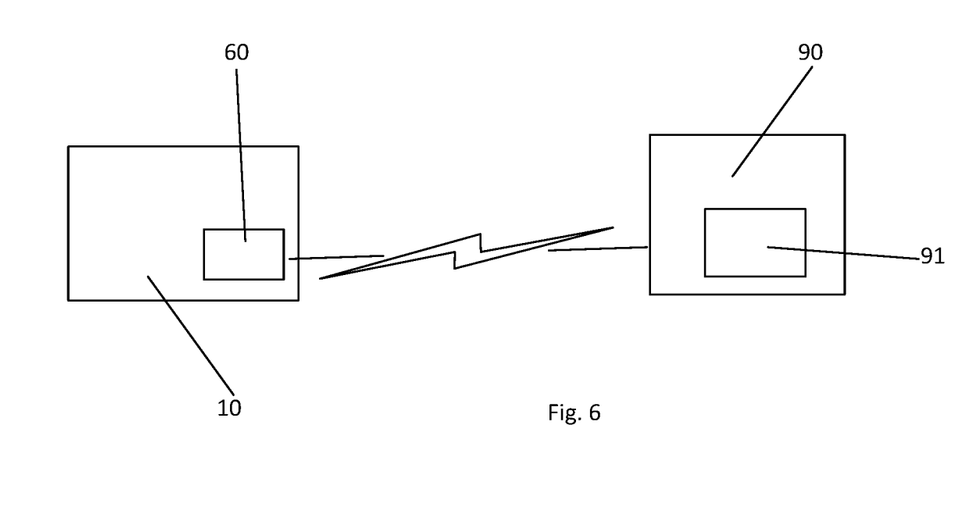
FIG. 6 is a schematic diagram of an embodiment.

FIG. 6 is a schematic diagram of a further embodiment.

In the illustrated embodiment, the portable color measurement device is intended to be used for hair dye selection in a hair salon, although it will be appreciated that it has application in supermarkets, pharmacies and the like selling hair products.

The portable color measurement device 10 has a communications system 60 and is arranged to communicate with a base station 90. A client's hair coloration and optionally composition is measured by placing strands of the client's hair in the portable color measurement device (it will be appreciated that hair does not need to be removed for this—the process would be no more uncomfortable than using hair curling iron or hair straighteners).

The portable color measurement device 10 measures properties of the client's hair and communicates data on these via the communications system 60 to the base station 90.

The client is consulted as to the desired hair color (for example by showing colors on a display, in a sample book etc). Optionally, the data received from the portable color measurement device may be used to determine certain colors that cannot be achieved and cause these to be precluded or otherwise flagged when the client is consulted.

At the base station, the data received from the portable color measurement device is cross-referenced against the desired hair color in a look-up table 91 (which may be stored locally in a data store at the base station or may be accessed from a remote source such as over the internet) to determine the hair dye or hair dye composition to be used. Based on the results, an appropriate pre-mixed hair dye is indicated or optionally a bespoke hair dye may be mixed.

It will be appreciated that these principles could also be applied to similar markets such as selection of printing ink, paint, fabrics and the like.

In situations such as this where the same device may be used on many people's hair, an optional UV light source or other mechanism may be included in the portable color measurement device so as to allow cleaning between changes of measurement targets.

Optionally, as well as measuring properties of color, the portable color measurement device may also measure other properties. For example, the camera may optionally be operated as a black and white sensor to determine relative transparency: a detected scatter pattern being related to porosity of hair ends. The device may also include a mass-spectrometer or similar system to assist in determining, amongst others, chemical composition.

Figure 7:
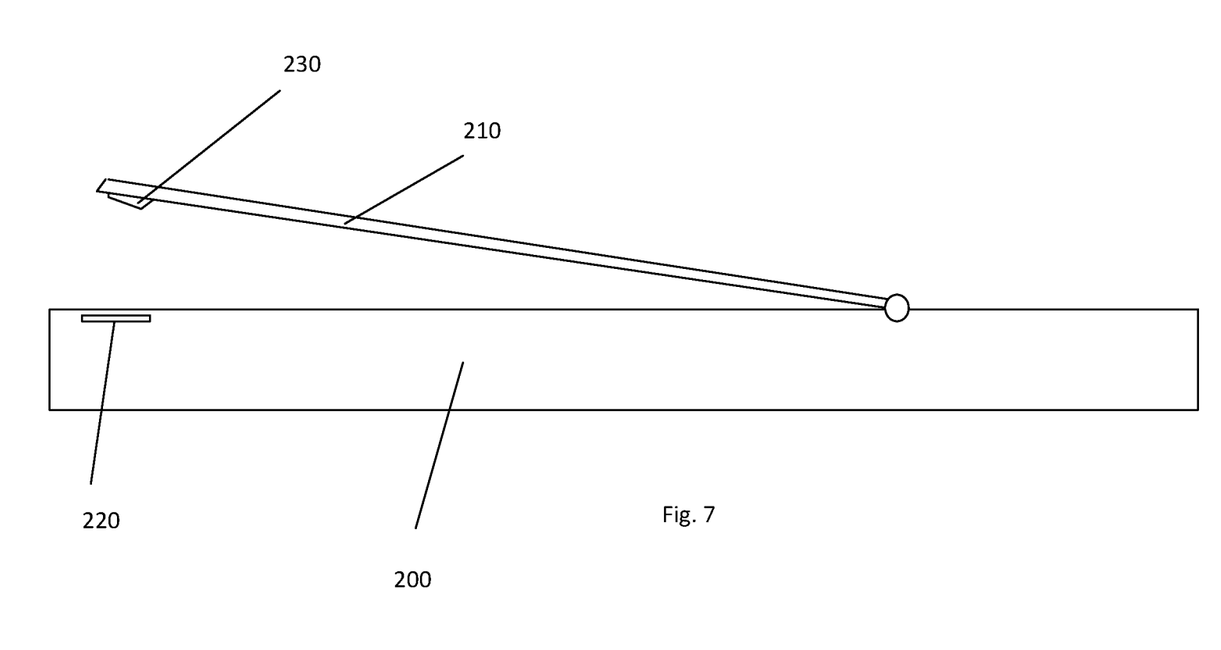
FIG. 7 is a schematic diagram of an embodiment.

In yet a further embodiment, the portable color measurement device may be built into a mobile phone case or mobile phone. For example, the mobile phone body 200 or case body may include a hinged arm 210 that can be swung over to oppose the mobile phone's camera 220 as shown in FIG. 7. The camera's LED flash may be used as the light source or the arm may include a light source 230—the element to be measured is placed between the arm and the camera and a user interface in the phone operated to cause measurements to be taken. It will be appreciated that the phone's camera need not be used and a further camera specifically for this purpose could be provided instead. In order for the camera to remain available for normal use, the arm may first slide along the phone body from a locking position and then be rotatable towards the camera.

In preferred embodiments, data on measurements is communicated to a remote system 85. This may be for processing to determine color properties from substantially raw data received from the device 10, it may be for refinement of data measured, it may be for storage for future reference, it may be for the purpose of retrieving complimentary colored items (such as clothing, hair dyes, furnishing etc) some combination of these or for a different purpose entirely.

Figure 8:
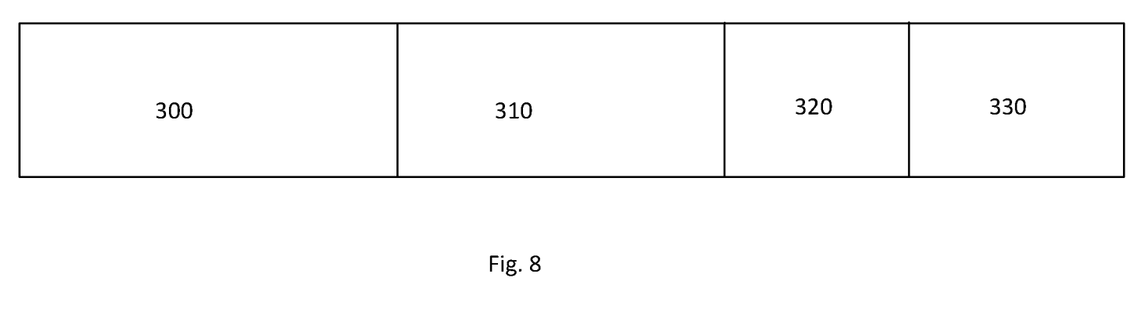
FIG. 8 is a schematic diagram of an embodiment.

In one example, data is communicated in a form as shown in FIG. 8. Data is preferably communicated in a form including a unique device ID (300) assigned to the portable color measurement device 10, optionally data on location and time of measurement (where available such as from the user's mobile phone—310), a light frequency measurement in nm (320) and optionally, a transparency measurement in lumens (330). This information preferably forms a unique signature for a measurement but is in a form that the measurement can be extracted from the metadata for use in comparison/matching as needed.

It will be appreciated that various embodiments of the present invention have been presented showing a variety of features. For the avoidance of doubt, the features are interchangeable between embodiments. Additionally, the embodiments are not limited to particular feature combinations—for example, one or more of the additional features discussed with reference to FIG. 4 could be introduced into the embodiment of FIG. 1. Likewise the post-capture systems discussed could also be varied or substituted as needed. In some instances, a communication link to a local system (such as the dye processing system of FIG. 6) may be all that is desired, in others, the communication and data storage arrangement of FIG. 5 may be desired. Likewise, external communication is not absolutely necessary. Embodiments may be provided which provide a local reading of some description on the device itself or via a local user interface device such as a user interface on a user's mobile phone that can communicate with the device as discussed with reference to FIG. 5.

It is to be appreciated that certain embodiments of the invention as discussed below may be incorporated as code (e.g., a software algorithm or program) residing in firmware and/or on computer useable medium having control logic for enabling execution on a computer system having a computer processor. Such a computer system typically includes memory storage configured to provide output from execution of the code which configures a processor in accordance with the execution. The code can be arranged as firmware or software, and can be organized as a set of modules such as discrete code modules, function calls, procedure calls or objects in an object-oriented programming environment. If implemented using modules, the code can comprise a single module or a plurality of modules that operate in cooperation with one another.

Optional embodiments of the invention can be understood as including the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although illustrated embodiments of the present invention have been described, it should be understood that various changes, substitutions, and alterations can be made by one of ordinary skill in the art without departing from the present invention which is defined by the recitations in the claims and equivalents thereof.

The invention claimed is:

1. A portable color measurement device having a body including a light source and a sensor, the body including a measurement zone to accommodate, within the body, an element to be measured for color, the light source being configured to emit light along a path within the body to the sensor, wherein the measurement zone is substantially in the path, the portable color measurement device being configured to measure properties of the accommodated element in dependence on one or more outputs of the sensor, the portable color measurement device further comprising a pair of levers forming opposing jaws around the measurement zone.

2. The portable color measurement device of claim 1, wherein the sensor has a position in the path to receive light from the light source that is reflected by the element when in the measurement zone.

3. The portable color measurement device of claim 1, further comprising a second light source configured to emit light along a further path, the further path being through the measurement zone and towards the sensor, the second light source being on an opposite side of the measurement zone to the sensor.

4. The portable color measurement device of claim 1, further comprising a return spring applying a sprung force to urge the jaws together.

5. The portable color measurement device of claim 1, further comprising a sensor configured to activate the color measurement device when a force is applied to the two levers to open the jaws.

6. The portable color measurement device of claim 1, further comprising a marker positioned on the body over the measurement zone.

7. The portable color measurement device of claim 1, further comprising a mechanical shroud to screen entry of external light into the sensor during operation of the portable color measurement device.

8. The portable color measurement device of claim 7, wherein the mechanical shroud is about the measurement zone.

9. The portable color measurement device of claim 7, wherein the mechanical shroud is about the sensor.

10. The portable color measurement device of claim 1, wherein the sensor is configured to sample red, green and blue values for each of a plurality of pixels of the measurement zone.

11. The portable color measurement device of claim 1, further comprising a short-range wireless communications system, the portable color measurement device being configured to communicate data on the measured properties using the short-range wireless communications system to a user device.

12. A portable color measurement system comprising a portable color measurement device having a body including a light source, a sensor and a short-range wireless communications system, the body including a measurement zone to accommodate, within the body, an area of an element to be measured for color, the light source being configured to emit light along a path within the body to the sensor, wherein the measurement zone is substantially in the path, the portable color measurement device being configured to measure properties of the accommodated element in dependence on one or more outputs of the sensor and to communicate data on the measured properties using the short-range wireless communications system to a user device, the portable color measurement device further comprising a pair of levers forming opposing jaws around the measurement zone.

13. The portable color measurement system of claim 12, further comprising a user interface executed by the user device, wherein the user device includes a processor to execute the user interface and a short range wireless communications system to receive the data on the measured properties from the portable color measuring device, the user interface comprising:
  computer program code configured to obtain the received data on the measured properties from the user device's short range wireless communications system; and,
  computer program code configured to transform the received data on the measured properties into a scheme value, the scheme value representing color measured by the portable color measurement device from the accommodated element.

14. The portable color measurement system of claim 13, wherein the sensor is configured to sample red, green and blue values for each of a plurality of pixels of the measurement zone and the data on the measured properties includes data on the sampled values.

15. The portable color measurement system of claim 13, wherein the user device includes a display, the user interface further comprising computer program code configured to output data on the scheme value on the display.

16. The portable color measurement system of claim 15, wherein the user device includes a data communications system, the user interface further comprising computer program code to retrieve data associated with the scheme value from a remote data source via the data communications system and output the retrieved data on the display.

17. The portable color measurement system of claim 16, wherein the remote data source includes data on products and data on each product's scheme value, the user interface further comprising computer program code to select one or more products having scheme values compatible with the scheme value of the element from the remote data source, retrieve data on said one or more products from the remote data source and output the retrieved data on the selected products on the display.

18. The portable color measurement system of claim 13, wherein the user device comprises a smartphone, the user interface comprising an application executable by the smartphone.

19. A dye determination system comprising a color measurement device and a base station, the color measurement device having a body including a light source and a sensor, the body including a measurement zone to accommodate, within the body, an area of an element to be measured for color, the light source being configured to emit light along a path within the body to the sensor, wherein the measurement zone is substantially in the path, the color measurement device being configured to measure properties of the accommodated element in dependence on one or more outputs of the sensor and to communicate data on the measured properties to the base station, the portable color measurement device further comprising a pair of levers forming opposing jaws around the measurement zone;

the base station including a processor, an input device, an output device and a memory encoding data on dyes, the data on dyes including resultant color upon application of each dye to an element of an input color, the processor being configured to:
execute computer program code to receive data on measured properties from the color measurement device;
execute computer program code to determine an input color from the received data on the measured properties;
execute computer program code to receive a selected resultant color from a user via the input device;
execute computer program code to cross-reference the input color and the resultant color in the memory to determine a dye; and,
execute computer program code to output data on the determined dye via the output device.

* * * * *